United States Patent
Seberger

(10) Patent No.: US 10,483,792 B2
(45) Date of Patent: Nov. 19, 2019

(54) METHODS AND APPARATUS TO PREVENT A FALSE TRIGGER OF A SHUTDOWN FUNCTION OF A PROCESS CONTROL COMPONENT

(71) Applicant: FISHER CONTROLS INTERNATIONAL LLC, Marshalltown, IA (US)

(72) Inventor: Stephen George Seberger, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 237 days.

(21) Appl. No.: 15/343,644

(22) Filed: Nov. 4, 2016

(65) Prior Publication Data

US 2018/0131228 A1    May 10, 2018

(51) Int. Cl.

| *H02J 7/00* | (2006.01) |
| *H02J 9/00* | (2006.01) |
| *H02J 9/06* | (2006.01) |
| H02J 7/34 | (2006.01) |

(52) U.S. Cl.
CPC .............. *H02J 9/061* (2013.01); *H02J 7/007* (2013.01); *H02J 7/0068* (2013.01); *H02J 7/345* (2013.01)

(58) Field of Classification Search
CPC .......... H02J 9/061; H02J 1/108; H02J 7/0068; H02J 7/007; H02J 7/345
USPC .......................................................... 307/66
See application file for complete search history.

(56) References Cited

U.S. PATENT DOCUMENTS

| 5,864,221 | A  | * | 1/1999  | Downs .................... H02J 1/108 320/134 |
| 5,990,575 | A  |   | 11/1999 | Flaugher |
| 8,931,756 | B2 |   | 1/2015  | Someya et al. |
| 2002/0089307 | A1 | * | 7/2002  | Yang ......................... G06F 1/26 320/116 |
| 2004/0038087 | A1 | * | 2/2004  | Shiue ...................... H01M 6/50 429/7 |
| 2011/0121654 | A1 | * | 5/2011  | Recker .................... H02J 9/065 307/66 |
| 2013/0082525 | A1 |   | 4/2013  | Szu |
| 2013/0285449 | A1 |   | 10/2013 | Schmidt et al. |
| 2014/0082394 | A1 | * | 3/2014  | Kitano .................. G06F 1/3287 713/324 |
| 2014/0139187 | A1 | * | 5/2014  | Peng ..................... H02J 7/0081 320/134 |

(Continued)

FOREIGN PATENT DOCUMENTS

WO    2012068017    5/2012

OTHER PUBLICATIONS

International Searching Authority, "International Search Report and Written Opinion," issued in connection with International Patent Application No. PCT/US2017/058392, dated Mar. 2, 2018, 13 pages.

*Primary Examiner* — Richard Tan
(74) *Attorney, Agent, or Firm* — Hanley, Flight & Zimmerman, LLC

(57) ABSTRACT

Methods and apparatus for enhancing reserve power units are described. An example apparatus includes a power source to operate a process control component and a power conditioner to provide power during a disruption of power from the power source to prevent a false trigger of a shutdown function of the process control component.

20 Claims, 2 Drawing Sheets

(56) References Cited

U.S. PATENT DOCUMENTS

2015/0185819 A1* 7/2015 Saito .................. G06F 19/00
                                                713/323
2016/0118798 A1* 4/2016 Terai .................. H02J 3/14
                                                307/23

* cited by examiner

METHODS AND APPARATUS TO PREVENT A FALSE TRIGGER OF A SHUTDOWN FUNCTION OF A PROCESS CONTROL COMPONENT

FIELD OF THE DISCLOSURE

This disclosure relates generally to process control components and, more particularly, to methods and apparatus to prevent a false trigger of a shutdown of a process control component.

BACKGROUND

Reserve power units (RPU) are operative to move a process control component (e.g., a valve) to a shutdown position during a safety shutdown or other power loss situation. When power from a power source is lost (i.e., due to a power outage) the RPU provides power and a control signal to the process control component to cause the process control component to move to a predetermined shutdown position. The RPU stores a sufficient amount of energy such that the process control component can be fully stroked. That is, if the predetermined shutdown position of the process control component is closed, the process control component can be moved from a fully open position to a fully closed position, or other predetermined position, using the energy stored in the RPU. In some examples, the RPU stores a surplus of energy as a precautionary measure.

SUMMARY

An example apparatus includes a power source to operate a process control component and a power conditioner to provide power during a disruption of power from the power source to prevent a false trigger of a shutdown function of the process control component.

An example method includes providing power to a process control component during normal operation via a power source and providing power to the process control component due to a disruption of power from the power source to prevent a false trigger of a shutdown condition via a power conditioner coupled to the process control component.

An apparatus comprising an energy storage device including a first storage component and a second storage component, the first storage component to provide power to a process control component upon a disruption of power from a power source, the second storage component to provide power to move the process control component to a shutdown position upon depletion of the first storage component.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
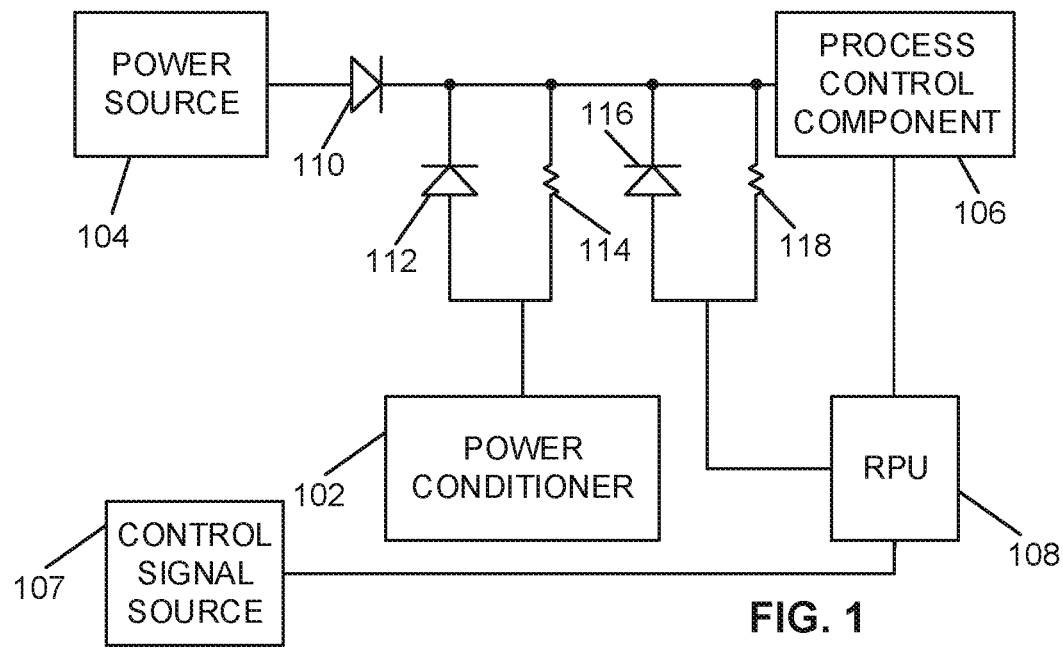
FIG. 1 represents an example implementation of the example apparatus described herein.

The example apparatus described herein may be implemented in a process control system to prevent disruptions of power to a process control component due to inconsistent power from a power supply. The example apparatus is operative to provide power to the process control component for a relatively short duration of time during a disruption (e.g., an interruption, a surge, etc.) of power from the power source. The example apparatus immediately begins to provide power to the process control component upon a disruption of the power from the power source. The power source is coupled to the process control component to provide power to the process control component to enable the process control component to move based on a control signal.

The example apparatus described herein is an energy storage device or power conditioner that is coupled to the process control component and disposed between the process control component and the power source. Upon disruption of power from the power source, the power provided by the power conditioner to the process control component prevents a false trigger of a shutdown condition. In systems that do not include the power conditioner described herein, a false trigger may occur when the power source experiences a temporary disruption of power that is shorter than a duration of time that necessitates a shutdown operation of the process control component, but which triggers a reserve power unit to perform the function of moving the process control component to a predetermined shutdown position. For example, a temporary power disruption caused by an overloaded power supply may last for one second, which may not be long enough to be a safety concern to necessitate a shutdown condition, but is long enough to trigger the reserve power unit to move the process control component to the predetermined shutdown position.

In the examples described here, one or more diodes may be positioned between a power source and a power conditioner to provide diode blocked capacitance. A first diode is operative to prevent discharge of the power conditioner to the power source and a second diode is operative to enable power flow from the power conditioner to the process control component when a disruption from the power source occurs. When the power from the power source is sufficient to operate the process control component, the first diode allows current to flow through the first diode to the process control component. When the power from the power supply is less than an amount sufficient to operate the process control component, the power from the power conditioner flows through the second diode to the process control component. A resistor may be operative to regulate a charge current of the power conditioner.

A reserve power unit (RPU) may also be coupled to the process control component to provide power to the process control component during a shutdown condition. Typically, the RPU provides a control signal and power to the process control component upon loss of power from the power source. It is not uncommon for power in a process control system to surge or become overloaded, which may cause multiple, frequent disruptions or interruptions of the power supplied to the process control component. As a result, the RPU may be triggered multiple times to perform a designated function of moving the process control component to a predetermined shutdown position or condition, resulting in frequent cycling of the process control component due to such false shutdown triggers. The example power conditioner described herein prevents false triggers of the RPU by providing power to the process control component during the above-noted short disruptions of power due to interruptions, surges or overloads.

The power conditioner supplies power temporarily until the power disruption or a designated period of time has passed. If the power source experiences a power outage, the power conditioner may provide power to the process control component for a short period of time before the power in the power conditioner is depleted and the RPU performs the designated function of moving the process control component to a shutdown position. The function of the power conditioner of the examples described herein does not interfere with the function of the RPU during shutdown conditions. For example, in a shutdown condition, the power source may be shut off and, thus, the disruption lasts longer than a time for which the power conditioner can provide backup power. In such examples, upon depletion of the power conditioner, the RPU is operative to move the process control component to a predetermined shutdown condition using a control signal and power stored in the RPU. In some examples, the power conditioner may be combined or integrated with the RPU. In such examples, the RPU maintains the conventional functions of an RPU in addition to the functions of the power conditioner described herein.

FIG. 1 represents an example implementation of the example apparatus 100 described herein. The example apparatus 100 of FIG. 1 depicts a power conditioner 102 operatively coupled between a power source 104 and a process control component 106 (e.g., a valve). During normal operation, the power source 104 provides power to the process control component and a control signal source 107 provides a control signal via a reserve power unit (RPU) 108 to operate the process control component 106. In the illustrated example, the RPU 108 is also disposed between the power conditioner 102 and the process control component 106. The example power conditioner 102 is operative to provide power to the process control component 106 during interruptions of power from the power source 104. In the example implementation depicted in FIG. 1, the power conditioner 102 is a standalone component that may be included with existing process control systems that may include an RPU, such as the RPU 108. The power conditioner 102 may include an energy storage component, such as capacitors, supercapacitors, a battery, or any other device(s) operative to store energy. In some examples, the power conditioner 102 includes a number of capacitors connected in a manner such that the capacitors are charged in parallel and discharged in series. Alternatively, the capacitors may be charged in series and charge balancing may be implemented. Energy storage components of the power conditioner 102 and the RPU 108 may include a DC-DC converter to facilitate more efficient charging and a more complete depletion of the energy storage components.

In some examples, environmental constraints (e.g., temperature, humidity) may cause design restraints that require the power conditioner 102 to include rechargeable batteries. In such cases, the batteries are replaceable at the end of the battery life instead of replacing the entire power conditioner 102. In some examples, the environmental constraints may additionally result in other changes to the power conditioner 102, such as a temperature regulator to heat and/or cool the power conditioner 102. Such temperature regulators may include thermoelectric devices, heat sinks, insulation, etc.

The power conditioner 102 may be configured to store any amount of energy sufficient to prevent false triggers of shutdown conditions. For example, the power conditioner 102 may be configured to provide power for up to 5 seconds. The example power conditioner 102 may be configured such that the power conditioner 102 may provide power for any length of time that may be reasonably considered a power disruption. In some examples, one power conditioner 102 is configurable to store more energy. Alternatively, multiple power conditioner(s) 102 may be included in the process control system to increase the length of time for which the power conditioner(s) 102 are operative to provide power to the process control component 106.

A first example diode 110 is operative to enable power flow from the power source to the process control component 106. The first example diode 110 does not allow power to flow from the power conditioner 102 to the power source 104 in the event of a power disruption. During a power disruption, an amount of power flowing through the first diode 110 is reduced or eliminated. Instead, power flows from the power conditioner 102 to the process control component 106 via the second diode 112 when the power from the power source 104 is disrupted. When the power source 104 is operative, the power conditioner 102 is charged. In other examples, instead of a blocked diode arrangement, a MOSFET (i.e., a metal-oxide semiconductor field-effect transistor) arrangement may be implemented. The MOSFET arrangement provides the one-way power flow of a diode without a voltage drop typically caused by a diode. A resistor 114 or any other current regulating circuit limits or regulates the charging current of the power conditioner 102.

Alternatively, an active circuit may be implemented with the power conditioner 102 to limit the charge current as necessary to prevent the total current from exceeding a capacity of the power source 104 and/or the power conditioner 102. Such a circuit would delay charging for a short period of time (e.g., seconds) when the process control component 106 is moving upon startup, but does not delay movement of the process control component 106.

The example RPU 108 of FIG. 1 is disposed between the power source 104 and the process control component 106 such that the RPU 108 is operative to provide power to the process control component 106 upon depletion of the power conditioner 102. When the RPU 108 provides power to the process control component 106, a third diode 116 enables power to flow from the RPU 108 to the process control component 106. The RPU 108 also interrupts the control signal from the control signal source 107 and provides a control signal to the process control component 106 to cause the process control component 106 to move to a predetermined shutdown position. Alternatively or additionally, the RPU 108 may modify or manipulate the control signal from the control signal source 107 and/or provide an additional control signal. The RPU 108 stores an amount of energy sufficient to move the process control component 106 to the predetermined shutdown position from any possible position of the process control component 106. The RPU 108 may be charged when power is flowing to the process control component 106 from the power source 104 and/or the power conditioner 102. A second resistor 118 may be used to regulate the charging current of the RPU 108.

When no power is flowing to the process control component 106, either from the power source 104 or the power conditioner 102, the RPU 108 provides power to and communicates a control signal to the process control component 106 to move the process control component 106 to the predetermined shutdown position. In some examples, there is a delay between the disruption of power flow to the process control component 106 and the RPU 108 communicating the control signal to the process control component 106. In some examples, the RPU 108 may include a voltage sensor to detect when the power is disrupted and/or when the power flow resumes. The delay may be adjusted based on the process control system. The delay enables the power conditioner 102 to provide power to the process control component 106 until the power conditioner 102 is depleted. Thus, rather than the RPU 108 providing a control signal upon detecting any disruption of power, the RPU 108 only provides a control signal when the power disruption has a duration that causes the power conditioner 102 to be depleted of energy. After the power from the power source 104 resumes, the control signal source 107 provides a signal to the process control component 106 to move the process control component 106 to a designated position. In some examples, the designated position is the position of the process control component 106 prior to the shutdown condition.

In some examples, the RPU 108 and the power conditioner 102 are substantially the same component that is configured differently based on the needs of the process control system. That is, the example power conditioner 102 and the example RPU 108 may be modular devices, each of which is capable of performing both the functions of the power conditioner 102 and the RPU 108. The modular devices are configured within the process control system in different ways based on whether the modular device is to perform the function of the power conditioner 102 or the RPU 108. For example, to configure the modular device as an RPU 108, a control signal is communicable between the RPU 108 and the process control component 106. However, when the modular device is configured as a power conditioner 102, the control signal capability is not used.

Figure 2:
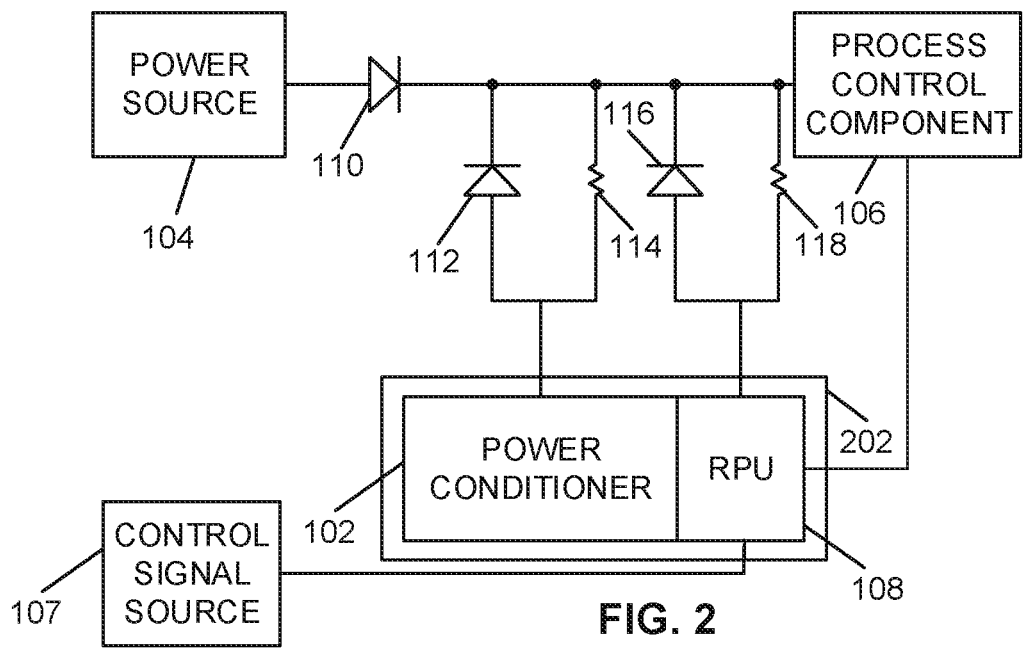
FIG. 2 represents and alternative example implementation of the example apparatus described herein.

FIG. 2 depicts an alternative example apparatus 200 including the example power conditioner 102 and the RPU 108 operatively coupled to the process control component 106. In the depicted example apparatus 200, the example power conditioner 102 and the RPU 108 may be combined or integrated as a single component within the process control system and enclosed in a housing 202. In some examples, the power conditioner 102 and the RPU 108 are separate components disposed in the same housing 202.

In examples in which the power conditioner 102 and the RPU 108 are integrated as a single energy storage device, the integral apparatus is operative to perform the functions of the power conditioner 102 and the functions of the RPU 108 described in conjunction with FIG. 1 above. In such examples, an amount of energy required to move the process control component 106 to a safety shutdown position from any position that may be a current position of the process control component 106. That is, the power conditioner 102 of the integral apparatus is not completely depleted until after the process control component 106 is moved to a safety shutdown position. Upon detection that a remaining amount of energy in the power conditioner 102 is a designated amount of energy required to perform the RPU 108 functionality of moving the process control component 106 to the predetermined shutdown position, the RPU 108 transmits a control signal to the process control component 106 to move the process control component 106 to the predetermined shutdown position. In some examples, whether or not the RPU 108 and the power conditioner 102 are integrated, to ensure that there is always sufficient power to move the process control component 106 to the predetermined shutdown position, the RPU 108 includes an energy storage component separate from the energy storage component of the power conditioner 102. In these examples, the energy storage component of the RPU 108 is not in communication with the energy storage component of the power conditioner 102.

In some examples, the RPU 108 and/or the power conditioner 102 may be housed in an explosion-proof enclosure (e.g., the housing 202 is an explosion-proof enclosure). In such examples, the energy from both the power conditioner 102 and the RPU 108 is depleted prior to service or maintenance. In such examples, the RPU 108 is fully recharged before normal operation of the process control component 106 is resumed. In some examples, to reduce the time required for startup, the energy in the RPU 108 is not depleted prior to servicing and, upon resuming operation, the energy and time required to recharge the RPU 108 is reduced.

Figure 3:
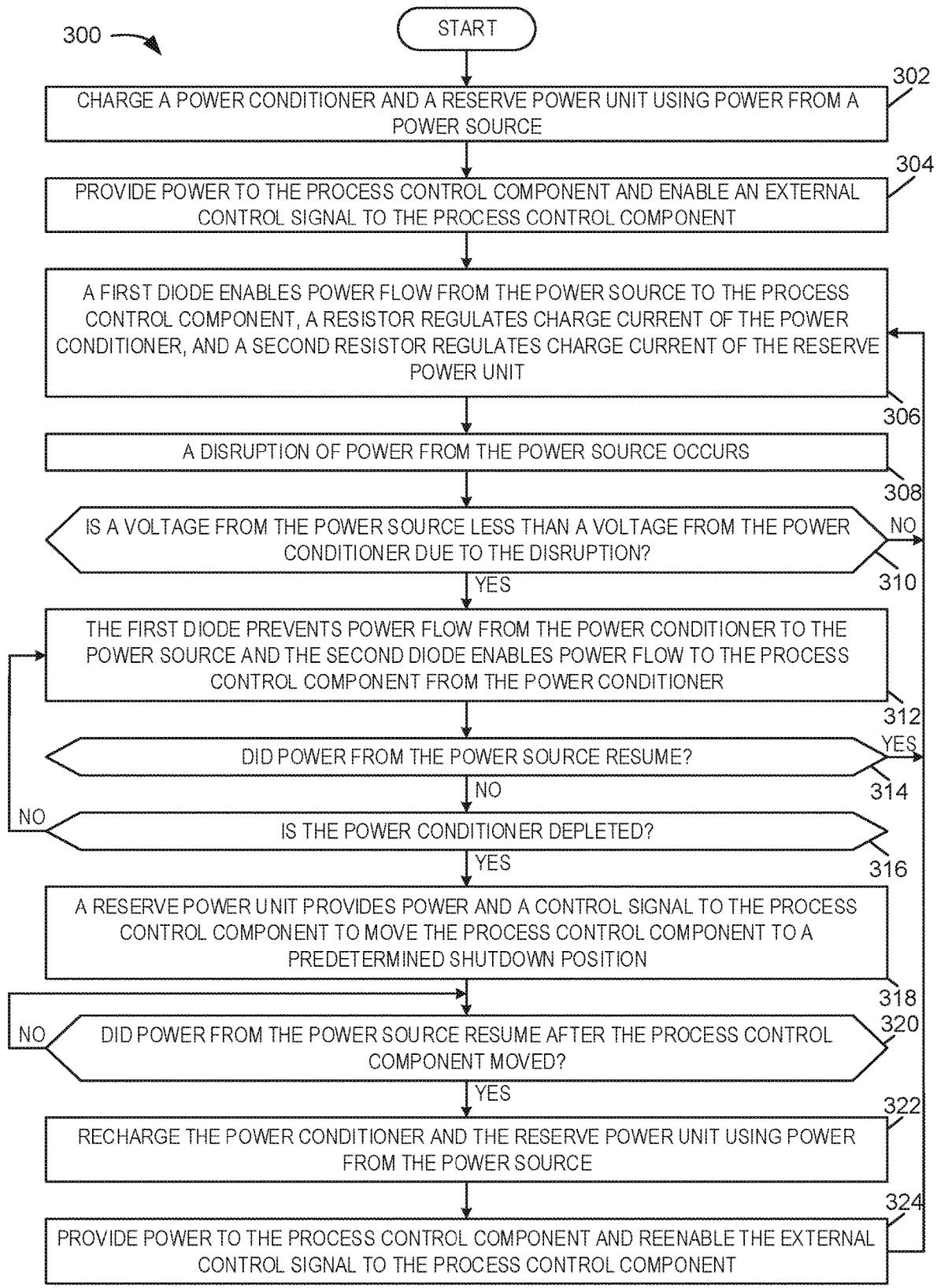
FIG. 3 represents an example method that may be implemented with the examples described herein.

FIG. 3 represents an example method 300 that may be implemented with the example apparatus 100, 200 described herein. In some examples, the order of execution of the blocks may be changed, and/or some of the blocks described may be changed, eliminated, or combined. The method 300 begins when the power source 104 charges the power conditioner 102 and the RPU 108 (block 302). The power source then provides power to the process control component 106 and a control signal from the control signal source 107 is enabled (block 304). When the power source 104 is providing a sufficient amount of power, a first diode 110 enables power flow from the power source 104 to the process control component 106, a resistor 114 regulates a charging current of the power conditioner 102, and a resistor regulates a charging current of the RPU 108 (block 306). The second diode 112 may also prevent excess current flow from the power source 104 to the power conditioner 102. A disruption of power from the power source 104 may occur (block 308). When the disruption occurs, the apparatus 100, 200 determines if a voltage of the power flowing from the power source 104 is less than a voltage of the power from the power conditioner 102 (block 310). If the voltage of the power flowing from the power source 104 is not less than the voltage from the power conditioner 102, the disruption was not significant enough to cause the power conditioner 102 to provide backup power to the process control component 106 and the power source 104 continues to provide power to the process control component 106.

If the voltage of the power flowing from the power source 104 is less than the voltage from the power conditioner 102, the first diode 110 prevents power flow from the power conditioner 102 to the power source and the second diode 112 enables power flow from the power conditioner 102 to the process control component 106 (block 312). The apparatus 100, 200 determines if power has resumed from the power source 104 (block 314). If power has resumed, the method 300 returns to block 306. If power has not resumed, the apparatus 100, 200 determines if the power conditioner 102 is depleted (block 316). If the power conditioner 102 is not depleted, the method 300 returns to block 312. If the power conditioner 102 is depleted, the RPU 108 provides power and a control signal to the process control component 106 to move the process control component 106 to a predetermined shutdown position (block 318). The apparatus 100, 200 determines whether the power from the power source 104 has resumed after the function of the RPU 108 is completed (block 320). If power has not returned, the apparatus 100, 200 will continue to wait for the power source 104 to resume providing power.

If the power has returned, the power conditioner 102 and RPU 108 are recharged via the power from the power source 104 (block 322). The power from the power source 104 is provided to the process control component 106 and the control signal from the control signal source 107 is re-enabled to the process control component (block 324). In some examples, the power is provided to the process control component 106 and to the power conditioner 102 and RPU 108 simultaneously. After block 324 is executed, the method 300 returns to block 306 indefinitely. In some examples, the process control component 106 may return to the position of the process control component 106 prior to the disruption of power from the power source 104.

From the foregoing, it will be appreciated that the above disclosed system, apparatus, and method prevent false triggers of a shutdown condition of a process control component.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a power source configured to operate a process control component;
a power conditioner configured to prevent a false trigger of a shutdown function of the process control component by providing power, based on energy stored at the power conditioner, from the power conditioner to the process control component during a disruption of power from the power source to the process control component that is less than a threshold disruption time; and
a reserve power unit operable independently from the power conditioner, the reserve power unit configured to move the process control component to a shutdown position by providing power, based on energy stored at the reserve power unit, from the reserve power unit to the process control component in response to a depletion of the energy stored at the power conditioner, the depletion caused by the disruption of power exceeding the threshold disruption time.

2. The apparatus as described in claim 1, further including a diode operatively positioned between the power source and the process control component and further operatively positioned between the power source and the power conditioner, the diode configured to enable power flow from the power source to the process control component, and to prevent power flow from the power conditioner to the power source.

3. The apparatus as described in claim 2, wherein the power conditioner is configured to provide power to the process control component when the power provided from the power source to the process control component is insufficient to operate the process control component.

4. The apparatus as described in claim 3, wherein the power conditioner is configured to be charged when the power provided from the power source to the process control component is sufficient to operate the process control component.

5. The apparatus as described in claim 4, further including a current regulating circuit configured to regulate a charging current of the power conditioner, the current regulating circuit operatively positioned between the diode and the power conditioner.

6. The apparatus as described in claim 1, wherein the reserve power unit is configured to provide power from the reserve power unit to the process control component during a shutdown condition.

7. The apparatus as described in claim 1, further including a diode configured to enable power flow from the power conditioner to the process control component.

8. A method comprising:
providing power from a power source to a process control component;
preventing a false trigger of a shutdown function of the process control component by providing power, based on energy stored at a power conditioner, from the power conditioner to the process control component during a disruption of power from the power source to the process control component that is less than a threshold disruption time; and
moving the process control component to a shutdown position by providing power, based on energy stored at a reserve power unit, from the reserve power unit to the process control component in response to a depletion of the energy stored at the power conditioner, the depletion caused by the disruption of power exceeding the threshold disruption time, the reserve power unit being operable independently from the power conditioner.

9. The method as described in claim 8, further including preventing power flow from the power conditioner to the power source during the disruption of power via a diode operatively positioned between the power source and the process control component and further operatively positioned between the power source and the power conditioner.

10. The method as described in claim 8, further including charging the power conditioner when power is provided from the power source to the process control component.

11. The method as described in claim 8, wherein the disruption of power is a surge or overload of the power source.

12. The method as described in claim 8, further including moving the process control component to a predetermined shutdown position by providing power from the reserve power unit to the process control component.

13. The method as described in claim 12, further including, upon resumption of power provided from the power source to the process control component, moving the process control component to a position based on a signal from a control signal source.

14. The method as described in claim 8, further including recharging the power conditioner and the reserve power unit upon resumption of power provided from the power source to the process control component.

15. An apparatus comprising:
an energy storage device including a first storage component and a second storage component operable independently from the first storage component, the first storage component configured to prevent a false trigger of a shutdown function of a process control component by providing power, based on energy stored at the first storage component, from the first storage component to the process control component during a disruption of power from a power source to the process control component that is less than a threshold disruption time, the second storage component configured to move the process control component to a shutdown position by providing power, based on energy stored at the second storage component, from the second storage component to the process control component in response to a depletion of the energy stored at the first storage component, the depletion caused by the disruption of power exceeding the threshold disruption time.

16. The apparatus as described in claim 15, wherein the second storage component includes an amount of energy sufficient to move the process control component from any position to the shutdown position.

17. The apparatus as described in claim 15, further including a housing, the energy storage device to be disposed within the housing.

18. The apparatus as described in claim 15, wherein the first storage component is a supercapacitor.

19. The apparatus as described in claim 15, wherein the second storage component causes the process control component to move to the shutdown position using a control signal.

20. The apparatus of claim 1, wherein the power conditioner is further configured to provide power from the power conditioner to the process control component in response to the power provided from the power source to the process control component being less than a threshold sufficient to operate the process control component while the power source is not experiencing a power failure.

\* \* \* \* \*